United States Patent [19]

Berg

[11] Patent Number: 4,671,715
[45] Date of Patent: Jun. 9, 1987

[54] LESSER SHOCK SEPARATION FASTENER

[75] Inventor: Robert E. Berg, Lomita, Calif.

[73] Assignee: Hi-Shear Corporation, Torrance, Calif.

[21] Appl. No.: 847,937

[22] Filed: Apr. 3, 1986

[51] Int. Cl.$^4$ .............................................. F16B 31/00
[52] U.S. Cl. ........................................ 411/8; 411/383; 411/390; 89/1.14; 89/1.57; 102/378
[58] Field of Search ...................... 411/2, 3, 4, 5, 8, 9, 411/10, 378, 383, 396, 390, 391, 916, 917; 89/1.14, 1.57; 102/378

[56] References Cited

U.S. PATENT DOCUMENTS

| 2,653,504 | 9/1953 | Smith | 411/396 X |
| 3,119,298 | 1/1964 | Brown | 411/396 X |
| 3,285,120 | 11/1966 | Kartiala | 411/8 |
| 3,352,189 | 11/1967 | Brown | 411/391 X |
| 3,386,138 | 6/1968 | Overman | 411/383 |
| 3,408,890 | 11/1968 | Bochman | 411/396 X |
| 3,435,724 | 4/1969 | Trungold | 411/10 |
| 3,546,999 | 12/1970 | Hosang | 411/391 X |

Primary Examiner—Thomas J. Holko
Attorney, Agent, or Firm—Donald D. Mon

[57] ABSTRACT

A shear type separation fastener having a punch piston which shears a ring of material from the head of a bolt to face the shank of the bolt. The punch piston has a face with a shearing edge that presents an advancing point of contact with the bolt head to reduce the maximum force needed to shear the material.

8 Claims, 2 Drawing Figures

4,671,715

LESSER SHOCK SEPARATION FASTENER

FIELD OF THE INVENTION

This invention relates to separation fasteners of the type which separate and release fastener systems as the consequence of a gas pressure, applied as a force in a shear mode.

BACKGROUND OF THE INVENTION

Separation fasteners which form part of a fastener system customarily utilize gas pressure as the power means for separation. The gas pressure is converted to a physical force that accomplishes the separation. There are two basic types of separation fasteners, classified by the mode in which the separation is attained. One is the tensile type, where an exerted force streches a portion of the fastener beyond its tensile capacity, and separation results. The other is the shear type, where a portion of the fastener is sheared from the remainder of the fastener. This invention relates to shear type separation fasteners.

It is a drawback of the known shear type fasteners that the force which must be exerted must be at least equal to the shear strength of the fastener. Thus, if the fastener's ultimate strength is determined by its resistance to shear forces at some critical location, then with conventional fasteners a force at least that great must be applied to effect the separation. This applied force constitutes a sharp shock on surrounding equipment, which it is best to minimize. However, reducing the area to be sheared for this purpose also reduces the strength of the joint, so there is little improvement possible by this means.

This invention applies the separation force in such a way as to reduce the force which must be applied to a level below the shear strength of the fastener, so as to maintain the same retentive capacity to resist shear loads, but this enables a separation to be made with a lesser shock.

BRIEF DESCRIPTION OF THE INVENTION

A separation fastener according to this invention includes a body having a bolt passage and a shoulder surrounding the passage, against which shoulder the head of a bolt bears, and by which it is retained. The shank of the bolt passes through the bolt passage. Shear mode separation is attained by shearing the head of the bolt to a lesser dimension, so that what is left of it passes through the passage to free the shank and effect the separation. The shearing force is exerted by a punch piston which has a face that presses against the bolt head to effect the shearing action.

However, in contrast with conventional types of separation fasteners, where the shearing action takes place at the boundary of the shoulder, in this invention the face of the punch piston is slanted so as to present a moving point of high stress concentration that enables the piston to punch through the head so as to free a center part of the head as a core integral with the shank. The force level required to accomplish this punching action is significantly less than the requirements for conventional separation, and accordingly the resultant shock is lesser.

According to a preferred but optional feature of the invention, the force exerted by the punch piston may be amplified by exerting the actuating gas forces on a differential area piston and transmitting the amplified force to the punch piston through a liquid or liquifiable medium.

The above and other features of this invention will be fully understood from the following detailed description and the accompanying drawings, in which:

DETAILED DESCRIPTION OF THE INVENTION

Figure 1:
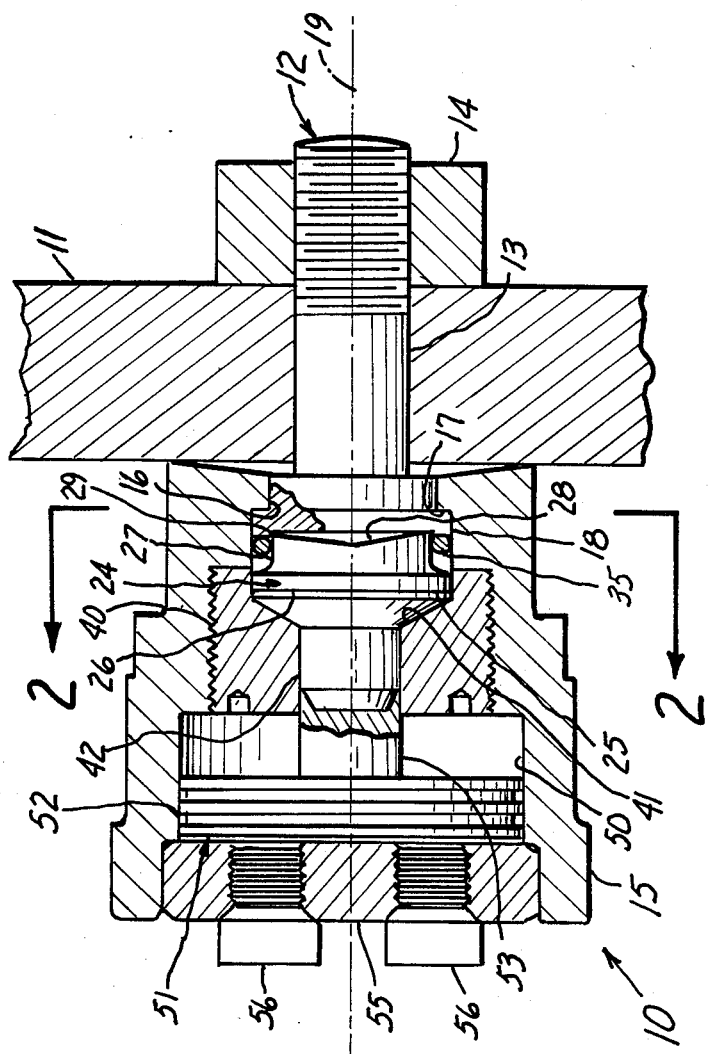
FIG. 1 is an axial cross-section of the presently-preferred embodiment of the invention with some parts shown in side view.
Figure 2:
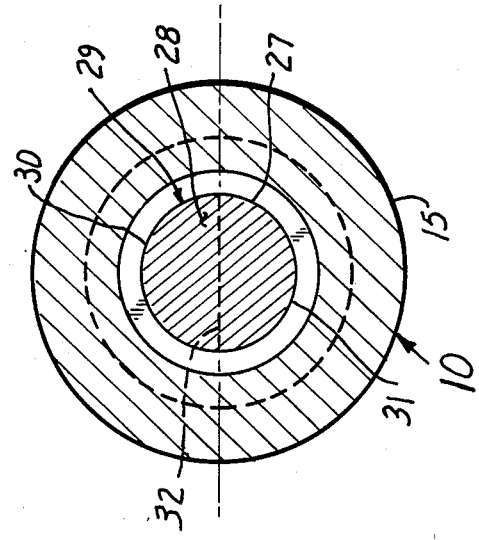
FIG. 2 is a cross-section taken at line 2—2 in FIG. 1.

A separation fastener 10 according to the invention is shown in FIG. 1 As a simple example, it is shown attached to an object 11. It includes a bolt 12 having a threaded shank 13 that passes through an aperture in the object. A nut 14 is shown applied to the shank, which pulls body 15 of the fastener against the object. Of course the body can be shaped otherwise. It could itself be threaded, or seated in a countersink, as other examples, and objects to be separated from object 11 could be attached to it. Persons knowledgeable in this art will readily recognize the pertinence of separating shank 13 from body 15. The specifics of shape of the fastener are unimportant to this invention. What is necessary is that there be a shank which will separate as the consequence of sufficient force exerted in shear.

Body 15 has an internal cavity which terminates at one end with a bolt passage 16 surrounded by a shoulder 17. The bolt has a head 18 that bears against shoulder 17, and separation is attained by shearing a circle relative to axis 19 within the diameter of the passage, which will permit a core of the head to leave the passage along with the shank.

Shear force is exerted on the bolt head by a punch piston 24 which is movable in a cylinder 25 adjacent to the shoulder. The punch piston has a head 26, a punch shank 27, and a punch face 28. The punch face has a circular cutting perimeter 29 with a diameter smaller than the diameter of the passage, so it can act as a punch, with a shearing action. The punch face is slanted or mitered, so as to present two cutting edges 30, 31 which extend from a forward extreme to the edge of a dihedral 32. Persons familiar with punch dies will recognize these shapes, and the punch die art is directly applicable to this punch piston.

An attenuator 35 is an elastomeric ring placed between the wall of the cylinder and the punch piston's shank. It will snub the movement of the punch piston after the bolt has been freed.

A rigid insert 40 in the cavity of the body forms a transmission chamber 41 which enlarges from a smaller diameter to the diameter of the head of the punch piston. A body 42 of liquid or liquifiable material is placed in the transmission chamber. By this term is meant a substance which is or can be made sufficiently plastic or deformable as to receive and transmit a force, behaving as a fluid while doing so. For higher pressure usages, this may be a body of lead which becomes plastic in the sense of deformation under sufficient pressure. Alternatively it could oe a body of silicone rubber, or even a true liquid, if loss of liquid can adequately be prevented. In all cases, the pressure applied to it is transmitted as such.

An amplification cylinder 50 is located concentrically, next to the insert. It houses a differential piston 51 with a large head 52 slideably fitted in cylinder 50. Its rod 53 has a lesser diameter, and fits closely in the insert.

A retainer 55 is attached to the body to close the cavity. It carries a plurality of gas-generating squibs 56 so disposed and arranged that when they are fired, their developed gases under high pressure are discharged into cylinder 50, against the head of the differential piston. The details of the cartridge, or of whatever source of fluid under pressure is used, are of no importance to this invention. Persons skilled in the art will recognize them, and will understand how they are to be selected and used.

The use and operation of this invention are straight forward. The fastener is installed as shown, or otherwise as preferred. When separation is to effected, the cartridge or cartridges are fired. The generated fluid will be exerted on the head of the differential piston. The exerted force will then be exerted by rod 53 (at a significantly higher unit pressure) on body 42. This pressure will then be exerted on the head of the punch piston.

Because the initial and continuing-developed reaction between the head of the bolt and the face of the punch piston will be on an advancing and limited area, the punch can pass through the head with a significantly lesser force than if the cutting edge had been a circle in a plane normal to the axis. It is this lesser force which results in a lesser shock than if the head were simply to be sheared off at the shoulder, or punched through by a planar punch.

The liquified medium and the differential piston are optional. Instead, the cartridge output could, with suitable modification of structure, be exerted directly on the punch piston, but at the cost of lesser efficiency.

This invention is not to be limited by the embodiments shown in the drawings and described in the description, which are given by way of example and not of limitation, but only in accordance with the scope of the appended claims.

I claim:

1. A shear-type separation fastener comprising:
   a body having an internal cavity, a passage through said body from said cavity, said passage having an axis and a shoulder in said cavity surrounding said passage;
   a bolt having a head bearing against said shoulder, and a shank extending from said head and passing axially through said passage;
   a cylinder having a wall in said passage;
   a punch piston sliceably fitted in said wall, making a fluid sealing fit therewith, and having a punch face axially confronting the head of said bolt, said punch face having a cutting edge which is oblique to a plane normal to said axis, whereby to make a progressive contact with said bolt head when forced against it; and
   a closure closing said cavity, said fastener being adapted to receive fluid pressure to force said punch piston toward said bolt head to shear away a ring of bolt material at the head, thereby to free the shank.

2. A separation fastener according to claim 1 in which said punch piston includes a head with a larger projected area normal to said axis than that of the punch face.

3. A separation fastener according to claim 1 in which said punch face is slanted relative to a plane normal to said axis.

4. A separation fastener according to claim 1 in which said punch face is mitered relative to a plane normal to said axis, whereby to form a concave dihedral angle on said punch face.

5. A separation fastener according to claim 1 in which a second cylinder with a larger diameter than said first cylinder is formed in said body, concentric with said axis, and in which a differential piston with a head is slideably fitted in said second cylinder, said differential piston having a rod with a diameter less than that of its head and in fluid communication with said first cylinder, fluid under pressure being exerted on the head of the differential piston, and pressure transmitting means in contact with both the rod of the differential piston and the punch piston.

6. A separation fastener according to claim 5 in which said pressure transmitting means is a substance which behaves as a fluid under the pressures exerted during separation.

7. A separation fastener according to claim 6 in which said substance is lead.

8. A separation fastener according to claim 6 in which said substance is silicone rubber.

* * * * *